United States Patent
Fujimoto

(10) Patent No.: US 12,512,788 B2
(45) Date of Patent: Dec. 30, 2025

(54) CONTROL DEVICE, COMPUTER READABLE STORAGE MEDIUM, SYSTEM, AND CONTROL METHOD

(71) Applicant: SOFTBANK CORP., Tokyo (JP)

(72) Inventor: Koji Fujimoto, Tokyo (JP)

(73) Assignee: SoftBank Corp., Tokyo (JP)

( * ) Notice: Subject to any disclaimer, the term of this patent is extended or adjusted under 35 U.S.C. 154(b) by 248 days.

(21) Appl. No.: 18/337,412

(22) Filed: Jun. 19, 2023

(65) Prior Publication Data
US 2023/0333573 A1 Oct. 19, 2023

Related U.S. Application Data

(63) Continuation of application No. PCT/JP2021/046356, filed on Dec. 15, 2021.

(30) Foreign Application Priority Data

Dec. 25, 2020 (JP) .................................. 2020-216695

(51) Int. Cl.
*H02S 50/15* (2014.01)
*B64D 27/353* (2024.01)
(Continued)

(52) U.S. Cl.
CPC .............. *H02S 50/15* (2014.12); *B64D 41/00* (2013.01); *B64U 50/31* (2023.01); *G05D 1/106* (2019.05);
(Continued)

(58) Field of Classification Search
CPC .............. G05D 1/106; G05D 2105/40; G05D 2105/47; G05D 2107/10; G05D 1/689;
(Continued)

(56) References Cited

U.S. PATENT DOCUMENTS

| 10,476,296 B1* | 11/2019 | Rausch | ................... B64U 50/34 |
| 2014/0252156 A1* | 9/2014 | Hiebl | ........................ B64C 3/30 244/3 |

(Continued)

FOREIGN PATENT DOCUMENTS

| JP | 2019135900 A | 8/2019 |
| JP | 2020019419 A | 2/2020 |
| JP | 2020179734 A | 11/2020 |

OTHER PUBLICATIONS

International Search Report and (ISA/237) Written Opinion of the International Search Authority for International Patent Application No. PCT/JP2021/046356, mailed by the Japan Patent Office on Feb. 1, 2022.

(Continued)

*Primary Examiner* — Donald J Wallace
*Assistant Examiner* — Jalal C Coduroglu

(57) ABSTRACT

Provided is a control device that controls a power supply flight vehicle, the control device including a control unit which controls the power supply flight vehicle so as to cause a light irradiation unit to radiate light toward a solar cell panel while flying following flight of a power supply target flight vehicle on which the solar cell panel is mounted. Provided is a control method to control a power supply flight vehicle, which is executed by a computer, the control method including controlling the power supply flight vehicle so as to cause a light irradiation unit to radiate light toward a solar cell panel while flying following flight of a power supply target flight vehicle on which the solar cell panel is mounted.

18 Claims, 12 Drawing Sheets

(51) Int. Cl.
*B64D 41/00* (2006.01)
*B64U 50/31* (2023.01)
*B64U 101/10* (2023.01)
*B64U 101/30* (2023.01)
*G05D 1/00* (2024.01)
*H02S 10/40* (2014.01)
*H02S 50/00* (2014.01)

(52) U.S. Cl.
CPC .............. *H02S 10/40* (2014.12); *H02S 50/00* (2013.01); *B64D 27/353* (2024.01); *B64U 2101/10* (2023.01); *B64U 2101/30* (2023.01)

(58) Field of Classification Search
CPC .... G05D 1/695; G05D 2109/22; B64D 41/00; B64D 27/353; B64D 47/02; H02S 10/40; H02S 50/00; H02S 50/15; B64U 2101/10; B64U 2101/30; B64U 50/31; B64U 2201/102; B64U 10/25; B64U 2101/20; B64U 2201/20; B64U 50/19; B64U 50/35; B64B 1/00; Y02T 50/50
See application file for complete search history.

(56) References Cited

U.S. PATENT DOCUMENTS

| | | | |
|---|---|---|---|
| 2017/0292841 A1* | 10/2017 | Sabe | G05D 1/102 |
| 2018/0129212 A1* | 5/2018 | Lee | G06F 3/017 |
| 2020/0412946 A1* | 12/2020 | Sugaya | H04N 5/77 |
| 2021/0078730 A1* | 3/2021 | Tajika | B64F 3/02 |
| 2021/0296894 A1* | 9/2021 | Abe | H02J 3/004 |
| 2023/0333573 A1* | 10/2023 | Fujimoto | G05D 1/695 |

OTHER PUBLICATIONS

Extended European Search Report for counterpart European Application No. 21910536.8, issued by the European Patent Office on May 13, 2024.

* cited by examiner ns as a stratospheric platform, light is radiated from a place 20 km or more away, and thus high accuracy is required. In addition, there is a problem that efficiency depends on weather conditions such as clouds between the flight vehicle, that is, the power supply target and the ground. A system 10 according to the present embodiment achieves efficient power transmission, for example, by causing the power supply flight vehicle 100 to stay in the vicinity of a power supply target flight vehicle instead of on the ground and irradiating the power supply target flight vehicle with light from the power supply flight vehicle 100. Since a flight speed, an altitude, a flight performance, and the like may be different between the power supply flight vehicle 100 and the power supply target flight vehicle, the system 10 may select an optimal following method in consideration of the flight characteristics of the power supply flight vehicle 100, the flight state of the power supply target flight vehicle, a flight pattern, a power transmission efficiency based on an irradiation angle and an irradiation continuity to a solar cell panel, and the like, and perform following control (including predictive control using AI or the like).

CONTROL DEVICE, COMPUTER READABLE STORAGE MEDIUM, SYSTEM, AND CONTROL METHOD

The contents of the following patent application(s) are incorporated herein by reference:
NO. 2020-216695 filed in JP on Dec. 25, 2020
NO. PCT/JP2021/046356 filed in WO on Dec. 15, 2021

BACKGROUND

1. Technical Field

The present invention relates to a control device, a computer readable storage medium, a system, and a control method.

2. Related Art

Patent Document 1 describes a technique for performing optical power transmission by irradiating a flight vehicle mounted with a solar cell panel with laser light from the ground.

CITATION LIST

Patent Document

Patent Document 1: Japanese Patent Application Publication No. 2020-019419

DESCRIPTION OF EXEMPLARY EMBODIMENTS

When optical power transmission is performed by irradiating a flight vehicle, that is, a power supply target with light from the ground, an irradiation technique by high-precision tracking is required. For example, when the power supply target is a high altitude platform station (HAPS) that func- Hereinafter, the present invention will be described through embodiments of the present invention, but the following embodiments do not limit the present invention according to claims. In addition, not all of the combinations of features described in the embodiments are essential to the solving means of the invention.

Figure 1:
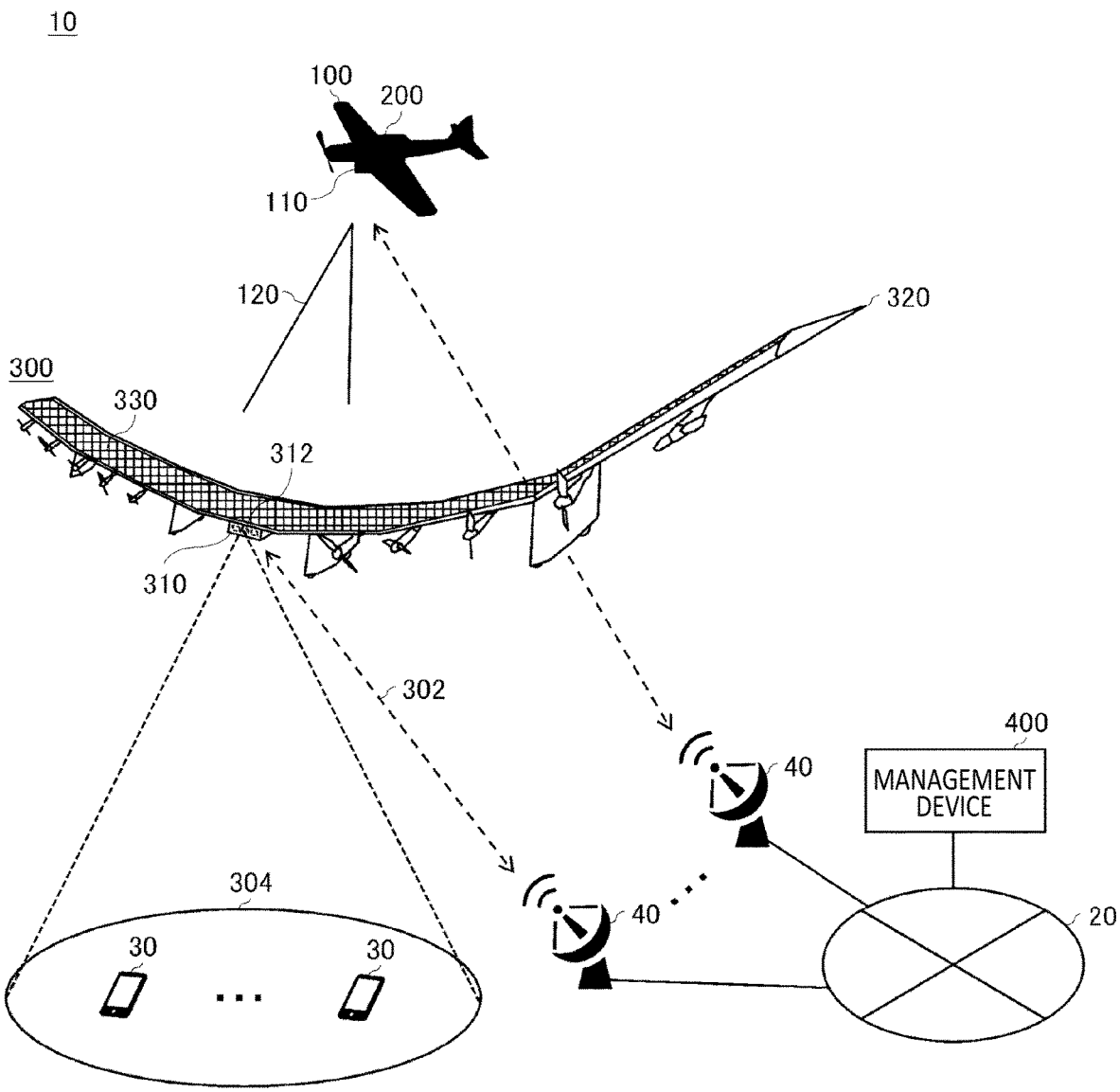
FIG. 1 schematically illustrates an example of a system 10.

FIG. 1 schematically illustrates an example of the system 10. The system 10 includes the power supply flight vehicle 100. The system 10 may include a HAPS 300. The HAPS 300 may be an example of the power supply target flight vehicle. The system 10 may include a management device 400.

The power supply flight vehicle 100 has a function of wirelessly supplying power to the power supply target flight vehicle. The power supply flight vehicle 100 may be any flight vehicle as long as it can fly following the flight of the power supply target flight vehicle and radiate light toward the power supply target flight vehicle. The power supply flight vehicle 100 may be, for example, an airplane. The motive power of the power supply flight vehicle 100 may be from a propeller or a jet engine, or may be other motive power. The power supply flight vehicle 100 may be loaded with fuel and may fly or radiate light 120 by using the fuel. In addition, the power supply flight vehicle 100 may be mounted with a large battery and may fly or use the light 120 by using the power of the battery.

The power supply flight vehicle 100 includes a mounting unit 110 on which various devices are mounted. The mounting unit 110 is mounted with a light irradiation unit 112 (not illustrated). The mounting unit 110 may be mounted with a camera 114 (not illustrated). The mounting unit 110 may be mounted with a radar 116 (not illustrated).

The power supply flight vehicle 100 supplies power to the power supply target flight vehicle by the light irradiation unit 112 radiating the light 120 toward the solar cell panel of the power supply target flight vehicle on which the solar cell panel is mounted.

Examples of the light 120 radiated by the light irradiation unit 112 include laser light, visible light, ultraviolet light, and infrared light. The light irradiation unit 112 is, for example, a search light. The light irradiation unit 112 may be a laser emission facility. The light irradiation unit 112 may be a floodlight, a spotlight, or the like.

The irradiation direction of the light 120 radiated by the light irradiation unit 112 may be adjustable. The power supply flight vehicle 100 includes, for example, an adjustment mechanism that adjusts the direction of the light irradiation unit 112. In addition, the light irradiation unit 112 itself may have an adjustment function of adjusting the irradiation direction of the light 120.

The power supply flight vehicle 100 may include a gimbal that holds the light irradiation unit 112. The gimbal reduces the shaking or the like of the light 120, which is radiated by the light irradiation unit 112, due to vibration or the like applied to the power supply flight vehicle 100.

The power supply flight vehicle 100 has a control device 200. The control device 200 controls the flight of the power supply flight vehicle 100. The control device 200 may manage various sensors included in the power supply flight vehicle 100. Examples of the sensor include a positioning sensor such as a global positioning system (GPS) sensor, a gyro sensor, an acceleration sensor, a wind sensor, and an air pressure sensor. The control device 200 may manage the position, the posture, the moving direction, the moving speed, and the like of the power supply flight vehicle 100 according to the outputs of various sensors. In addition, the control device 200 may manage the air flow, the air pressure, and the like of a flight area, in which the power supply flight vehicle 100 is flying, according to the outputs of the various sensors.

In addition, the control device 200 controls the light irradiation unit 112. The control device 200 may adjust the irradiation direction of the light 120 by controlling the adjustment mechanism of the light irradiation unit 112. The control device 200 may adjust the irradiation direction of the light 120 by controlling the adjustment function of the light irradiation unit 112.

The control device 200 may control the camera 114. For example, the control device 200 causes the camera 114 to capture an image of the HAPS 300 and acquires the captured image of the HAPS 300.

The control device 200 may control the radar 116. The control device 200 may measure a distance to the HAPS 300 by the radar 116, for example.

The HAPS 300 may function as a stratospheric platform. While flying in the stratosphere, the HAPS 300 forms a feeder link 302 with a gateway 40 on the ground and forms a wireless communication area 304 on the ground.

The HAPS 300 includes a main body portion 310, a wing portion 320, and a solar cell panel 330. In the example illustrated in FIG. 1, the solar cell panel 330 is arranged on the upper surface of the wing portion 320.

The power generated by the solar cell panel 330 is accumulated in one or more batteries arranged in at least one of the main body portion 310 or the wing portion 320. The power accumulated in the battery is used by each component included in the HAPS 300.

A control device 312 is arranged in the main body portion 310. The control device 312 controls the flight and communication of the HAPS 300.

The control device 312 controls the flight of the HAPS 300, for example, by controlling the rotation of a propeller, the angle of a flap or an elevator, and the like. The control device 312 may manage various sensors included in the HAPS 300. Examples of the sensor include a positioning sensor such as a GPS sensor, a gyro sensor, an acceleration sensor, a wind sensor, and an air pressure sensor. The control device 312 may manage the position, the posture, the moving direction, and the moving speed of the HAPS 300 according to the outputs of various sensors. In addition, the control device 312 may manage the air flow, the air pressure, and the like in a flight area, in which the HAPS 300 is flying, according to the outputs of various sensors. In addition, the control device 312 may manage the status of the power generation by the solar cell panel 330.

The control device 312 may form the feeder link 302 with the gateway 40 by using, for example, a feeder link (FL) antenna. The control device 312 may access a network 20 via the gateway 40.

The control device 312 may transmit various types of information to the management device 400 connected to the network 20. The control device 312 transmits, for example, telemetry information to the management device 400.

The telemetry information may include the position information of the HAPS 300. The position information may indicate the three-dimensional position of the HAPS 300. The telemetry information may include the posture information of the HAPS 300. The posture information may indicate the pitch, the roll, and the yaw of the HAPS 300. The telemetry information may include moving direction information indicating the moving direction of the HAPS 300. The telemetry information may include moving speed information indicating the moving speed of the HAPS 300.

The telemetry information may include area information indicating the status of the flight area in which the HAPS 300 is flying. The area information may include the air flow information of the flight area in which the HAPS 300 is flying. The area information may include the air pressure information of the flight area in which the HAPS 300 is flying.

The telemetry information may include power generation status information indicating the status of the power generation by the solar cell panel 330. The power generation status information may indicate whether power is being generated by the solar cell panel 330. The power generation status information may include information regarding the amount of the power generation by the solar cell panel 330. The information regarding the power generation amount includes, for example, a power generation amount per unit time.

In addition, the control device 312 forms the wireless communication area 304 on the ground by using, for example, a service link (SL) antenna. The wireless communication area 304 forms a service link with a user terminal 30 on the ground by using the SL antenna.

The user terminal 30 may be any communication terminal as long as it can communicate with the HAPS 300. For example, the user terminal 30 is a cellular phone such as a smartphone. The user terminal 30 may also be a tablet terminal, a PC (Personal Computer), and the like. The user terminal 30 may also be, a so-called IoT (Internet of Thing) device. The user terminal 30 can include anything that corresponds to, a so-called IoE (Internet of Everything).

The HAPS 300 relays communication between the network 20 and the user terminal 30, for example, via the feeder link 302 and the service link. The HAPS 300 may provide a wireless communication service to the user terminal 30 by relaying the communication between the user terminal 30 and the network 20.

The network 20 includes a mobile communication network. The mobile communication network may conform to any of the 3G (3rd Generation) communication system, the LTE (Long Term Evolution) communication system, the 5G (5th Generation) communication system, and the 6G (6th Generation) communication system and the communication system of the subsequent generation. The network 20 may include the Internet.

For example, the HAPS 300 transmits the data received from the user terminal 30 in the wireless communication area 304 to the network 20. In addition, when the data addressed to the user terminal 30 in the wireless communication area 304 is received via the network 20, for example, the HAPS 300 transmits the data to the user terminal 30.

The management device 400 manages the HAPS 300. The management device 400 may communicate with the HAPS 300 via the network 20 and the gateway 40. Note that the management device 400 may communicate with the HAPS 300 via a communication satellite. The management device 400 may control the HAPS 300 by transmitting various instructions.

The management device 400 may cause the HAPS 300 to hover in the sky above a target area so that the wireless communication area 304 covers the target area on the ground. For example, while flying in a circular orbit in the sky above the target area, the HAPS 300 maintains the feeder link with the gateway 40 by adjusting the orientation direction of the FL antenna, and maintains the wireless communication area 304 covering the target area by adjusting the orientation direction of the SL antenna.

The management device 400 manages the power supply flight vehicle 100. The management device 400 may communicate with the power supply flight vehicle 100 via the network 20 and the gateway 40. Note that the management device 400 may communicate with the power supply flight vehicle 100 via a communication satellite. The management device 400 may control the power supply flight vehicle 100 by transmitting various instructions.

The management device 400 instructs the power supply flight vehicle 100 to supply power to the HAPS 300, for example, when an abnormality occurs in the power supply system of the HAPS 300 or the amount of power generated by the solar cell panel 330 alone is insufficient for the power.

Although FIG. 1 illustrates the HAPS 300 as an example of the power supply target flight vehicle, the present invention is not limited thereto. The power supply target flight vehicle may be any flight vehicle as long as it is a flight vehicle mounted with a solar cell panel. In addition, the power supply flight vehicle 100 may supply power to other than the flight vehicle. For example, the power supply flight vehicle 100 may radiate the light 120 toward the solar cell panel of a solar power plant or the like fixed on the ground.

In addition, the power supply flight vehicle 100 may use the light 120 for purposes other than power supply. For example, when the light irradiation unit 112 radiates laser light, the state of a typhoon or the like may be measured from above or the undulation of a land may be measured by the laser light. In addition, for example, the power supply flight vehicle 100 may use the light 120 for purpose of rescue. As a specific example, when finding a rescue boat, the power supply flight vehicle 100 uses the light 120 for the purpose of illuminating the rescue boat with the light 120.

Figure 2:
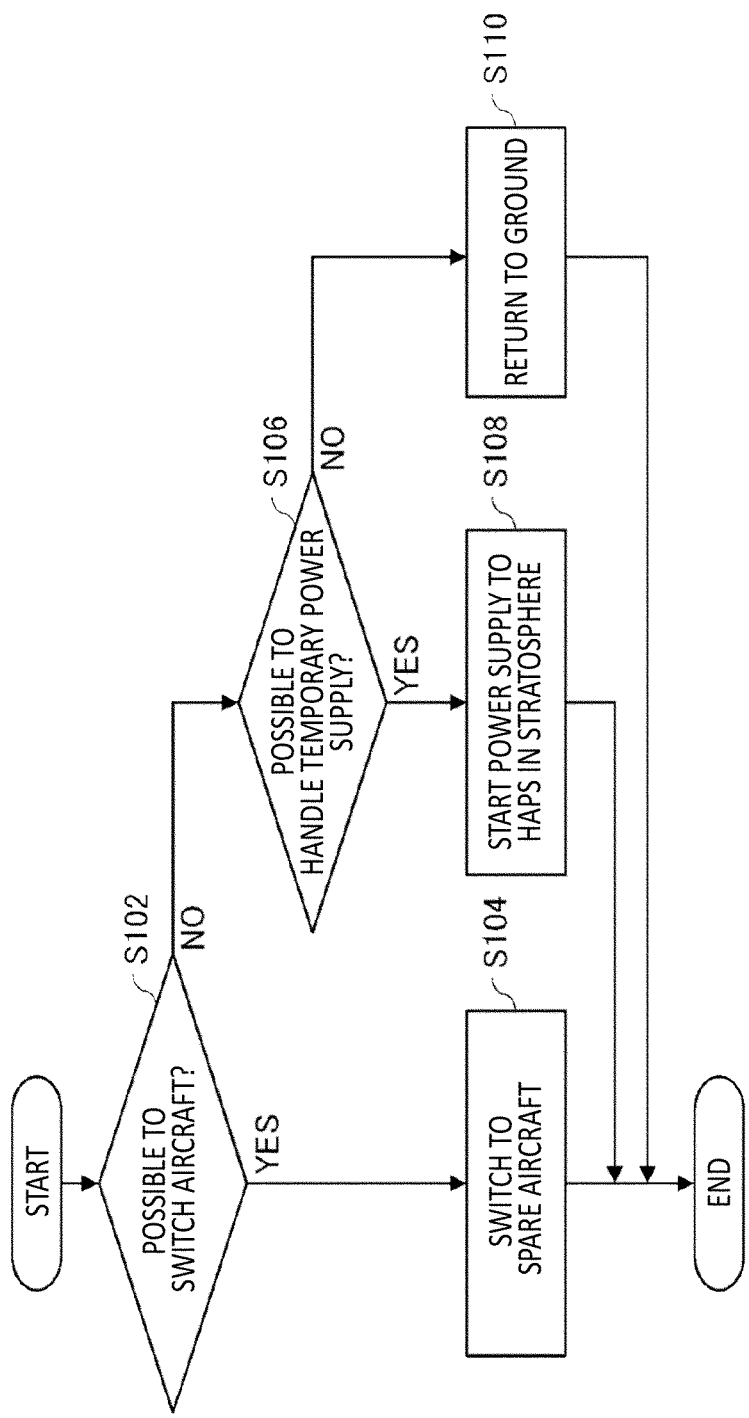
FIG. 2 schematically illustrates an example of a flow of processing in the system 10.

FIG. 2 schematically illustrates an example of a flow of processing in the system 10. The processing illustrated in FIG. 2 is started in response to occurrence of an abnormality in the power supply system of the HAPS 300.

In step 102 (the step may be abbreviated as S), the management device 400 determines whether it is possible to switch the HAPS 300, in which an abnormality occurs in the power supply system, to another aircraft. For example, the management device 400 determines that the switching is possible when there is an available spare aircraft, and determines that the switching is impossible when there is no available spare aircraft. When it is determined that the switching is possible, the process proceeds to S104, and when it is determined that the switching is impossible, the process proceeds to S106.

In S104, the management device 400 switches the HAPS 300, in which an abnormality occurs in the power supply system, to the spare aircraft. For example, the management device 400 moves to the flight area of the HAPS 300 in which an abnormality occurs in the power supply system, and transmits, to the backup HAPS 300, an instruction to form a wireless communication area similar to the wireless communication area formed by the HAPS 300. In addition, the management device 400 transmits an instruction to return to the ground after the replacement with the spare HAPS 300 to the HAPS 300 in which an abnormality occurs in the power supply system.

In S106, the management device 400 determines whether a temporary power supply can be handled. For example, the management device 400 determines that the handling is possible when there is the power supply flight vehicle 100 capable of supplying power to the HAPS 300 in which an abnormality has occurred in the power supply system, and determines that the handling is not possible when there is no power supply flight vehicle 100 capable of supplying power. When it is determined that the handling is possible, the process proceeds to S108, and when it is determined that the handling is not possible, the process proceeds to S110.

In S108, the management device 400 transmits, to the power supply flight vehicle 100, a power supply instruction to the HAPS 300. The power supply flight vehicle 100 that has received the power supply instruction moves to the flight area of the HAPS 300 in the stratosphere, and starts power supply to the HAPS 300 while flying following the flight of the HAPS 300. The power supply flight vehicle 100 returns to the ground after the power supply is completed.

In S110, the management device 400 instructs the HAPS 300, in which an abnormality occurs in the power supply system, so as to return to the ground. The HAPS 300 returns to the ground in response to the instruction.

Figure 3:
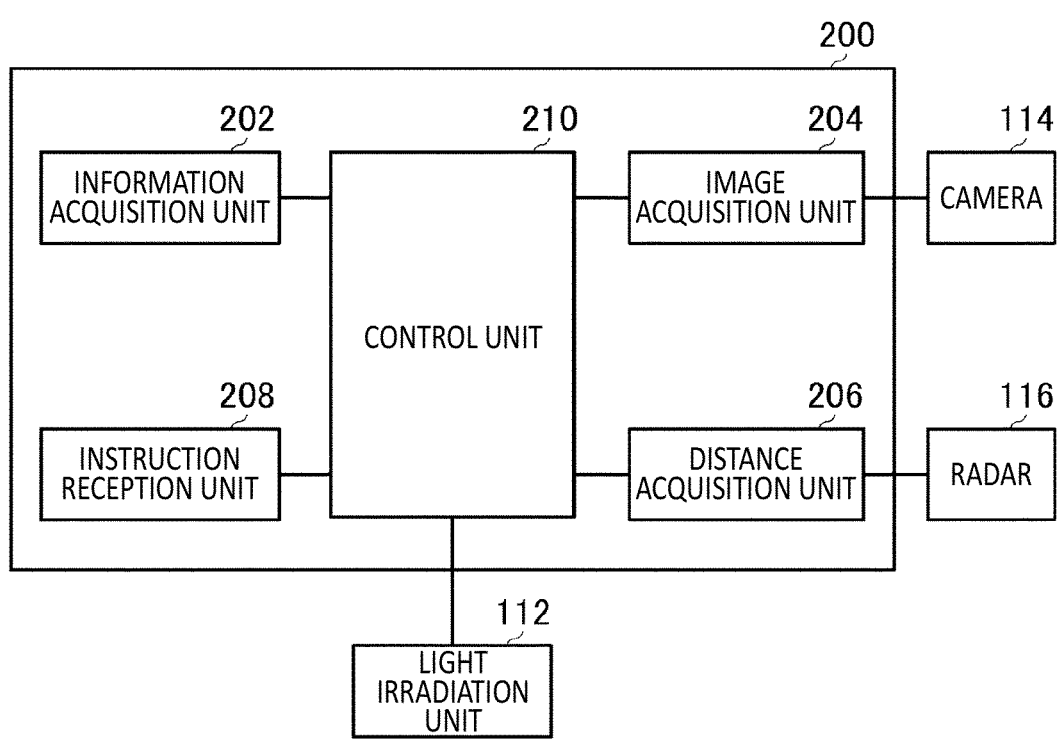
FIG. 3 schematically illustrates an example of a functional configuration of a control device 200.

FIG. 3 schematically illustrates an example of a functional configuration of the control device 200. The control device 200 includes an information acquisition unit 202, an image acquisition unit 204, a distance acquisition unit 206, an instruction reception unit 208, and a control unit 210.

The information acquisition unit 202 acquires various types of information. The information acquisition unit 202 may acquire information related to the power supply flight vehicle 100. The information acquisition unit 202 may acquire information output by various sensors included in the power supply flight vehicle 100. For example, the information acquisition unit 202 acquires the position information of the power supply flight vehicle 100. For example, the information acquisition unit 202 acquires the posture information of the power supply flight vehicle 100. For example, the information acquisition unit 202 acquires the moving direction of the power supply flight vehicle 100. For example, the information acquisition unit 202 acquires the moving speed of the power supply flight vehicle 100. For example, the information acquisition unit 202 acquires area information indicating the air flow, the air pressure, and the like of the flight area where the power supply flight vehicle 100 is flying.

The information acquisition unit 202 may acquire the information transmitted by the HAPS 300. For example, the information acquisition unit 202 receives, from the management device 400, the information transmitted from the HAPS 300 to the management device 400. The information acquisition unit 202 may receive, via the gateway 40, the information transmitted from the HAPS 300 to the management device 400 via the feeder link 302 and the gateway 40.

For example, the information acquisition unit 202 acquires the telemetry information transmitted by the HAPS 300. The information acquisition unit 202 may acquire the position information of the HAPS 300. The information acquisition unit 202 may acquire the posture information of the HAPS 300. The information acquisition unit 202 may acquire the moving direction information of the HAPS 300. The information acquisition unit 202 may acquire the moving speed information of the HAPS 300. The information acquisition unit 202 may acquire area information indicating the status of the flight area in which the HAPS 300 is flying. The information acquisition unit 202 may acquire the power generation status information of the HAPS 300.

The image acquisition unit 204 acquires the captured image captured by the camera 114. For example, the image acquisition unit 204 causes the camera 114 to capture an image of the HAPS 300 and acquires the captured image of the HAPS 300.

The distance acquisition unit 206 acquires a distance between the power supply flight vehicle 100 and the HAPS 300. The distance acquisition unit 206 may cause the radar 116 to measure the distance between the power supply flight vehicle 100 and the HAPS 300. The distance acquisition unit 206 may acquire the distance between the power supply flight vehicle 100 and the HAPS 300 measured by the radar 116.

The instruction reception unit 208 receives various instructions from the management device 400. The instruction reception unit 208 may receive an instruction from the management device 400 via the network 20 and the gateway 40.

The management device 400 may transmit, to the power supply flight vehicle 100, an instruction including control-related information. The control-related information may be information used for the power supply flight vehicle 100 to radiate the light 120 toward the solar cell panel 330 of the HAPS 300 while flying following the flight of the HAPS 300. The control-related information includes, for example, information indicating the flight area of the HAPS 300. The control-related information includes, for example, information indicating the flight pattern of the HAPS 300. The control-related information includes, for example, information indicating the flight speed of the HAPS 300.

The control unit 210 controls the flight of the power supply flight vehicle 100 and the irradiation of the light 120 according to the instruction received by the instruction reception unit 208. By using the control-related information included in the instruction, the control unit 210 controls the power supply flight vehicle 100 so as to cause the light irradiation unit 112 to radiate the light 120 toward the solar cell panel 330 of the HAPS 300 while flying following the flight of the HAPS 300. The control unit 210 may control the power supply flight vehicle 100 so as to cause the light irradiation unit 112 to radiate the light 120 toward the solar cell panel 330 of the HAPS 300 while flying following the flight of the HAPS 300 in the stratosphere.

On the basis of the information acquired by the information acquisition unit 202, the control unit 210 may control the power supply flight vehicle 100 so as to adjust the direction of the light radiated by the light irradiation unit 112. For example, on the basis of the information acquired by the information acquisition unit 202, the control unit 210 controls the flight of the power supply flight vehicle 100 so as to adjust the direction of the light radiated by the light irradiation unit 112. In addition, for example, on the basis of the information acquired by the information acquisition unit 202, the control unit 210 controls the irradiation direction of the light 120 radiated by the light irradiation unit 112 so as to adjust the direction of the light radiated by the light irradiation unit 112. On the basis of the information acquired by the information acquisition unit 202, the control unit 210 may adjust both the flight of the power supply flight vehicle 100 and the irradiation direction of the light 120 radiated by the light irradiation unit 112 so as to adjust the direction of the light radiated by the light irradiation unit 112.

For example, on the basis of the position information of the HAPS 300, the control unit 210 controls the power supply flight vehicle 100 so as to adjust the direction of the light 120 radiated by the light irradiation unit 112. The control unit 210 may specify a positional relationship between the power supply flight vehicle 100 and the HAPS 300 by using the position information of the HAPS 300, and control the flight of the power supply flight vehicle 100 and the irradiation direction of the light 120 radiated by the light irradiation unit 112, such that the light 120 is radiated toward the HAPS 300.

For example, on the basis of the posture information of the HAPS 300, the control unit 210 controls the power supply flight vehicle 100 so as to adjust the direction of the light 120 radiated by the light irradiation unit 112. The control unit 210 may specify the relative angle or the like of the solar cell panel 330 by using the posture information of the HAPS 300, and control the flight of the power supply flight vehicle 100 and the irradiation direction of the light 120 radiated by the light irradiation unit 112, such that the inclination of the incident angle of the light 120 on the solar cell panel 330 becomes small.

For example, on the basis of the area information indicating the status of the flight area in which the HAPS 300 is flying, the control unit 210 controls the power supply flight vehicle 100 so as to adjust the direction of the light 120 radiated by the light irradiation unit 112. For example, while the power supply flight vehicle 100 is flying in accordance with the flight pattern of the HAPS 300, the control unit 210 simulates an optimal flight method in real time according to changes in air flow, air pressure, or the like in the flight area where the HAPS 300 is flying. The control unit 210 may control the power supply flight vehicle 100 to adjust at least one of the flight speed or a flight route such that the power supply flight vehicle can fly following the flight of the HAPS 300 even when the air flow, the air pressure, and the like change.

For example, on the basis of the power generation status information of the HAPS 300, the control unit 210 controls the power supply flight vehicle 100 so as to adjust the direction of the light 120 radiated by the light irradiation unit 112. For example, the control unit 210 monitors a change in the amount of the power generation by the solar cell panel 330 while changing the direction of the light 120 radiated by the light irradiation unit 112, and specifies the direction of the light 120 having the highest amount of power generation. In addition, the control unit 210 checks, on the basis of the power generation status information, whether power generation is being performed, and when power generation is not being performed, adjusts at least one of the flight method of the power supply flight vehicle 100 or the irradiation direction of the light 120 by the light irradiation unit 112 until power generation is performed.

On the basis of the captured image acquired by the image acquisition unit 204, the control unit 210 may control the power supply flight vehicle 100 so as to adjust the direction of the light radiated by the light irradiation unit 112. For example, the control unit 210 determines the status of the solar cell panel 330 of the HAPS 300 on the basis of the captured image obtained by imaging the HAPS 300, and controls the power supply flight vehicle 100 so as to adjust the direction of the light radiated by the light irradiation unit 112 according to the determination result. For example, on the basis of the captured image, the control unit 210 discerns the angle, the size, and the shape (the warp of the aircraft or the like) of the solar cell panel 330 when viewed from the power supply flight vehicle 100.

On the basis of the distance between the power supply flight vehicle 100 and the HAPS 300 acquired by the distance acquisition unit 206, the control unit 210 may control the power supply flight vehicle 100 so as to adjust the direction of the light radiated by the light irradiation unit 112. For example, by controlling the flight of the power supply flight vehicle 100, the control unit 210 adjusts the direction of the light radiated by the light irradiation unit 112 while adjusting the distance between the power supply flight vehicle 100 and the HAPS 300.

By using a plurality of pieces of information among the position information, the posture information, the moving direction information, and the moving speed information of the HAPS 300, the area information indicating the status of the flight area where the HAPS 300 is flying, the power generation status information of the HAPS 300, the captured image captured by the camera 114, and the distance between the power supply flight vehicle 100 and the HAPS 300, the control unit 210 may control the power supply flight vehicle 100 so as to adjust the direction of the light radiated by the light irradiation unit 112. By using a plurality of pieces of information among them, the control unit 210 may adjust the position of the power supply flight vehicle 100, the irradiation position of the light 120, the irradiation angle of the light 120, and the like so as to further increase the light receiving efficiency of the solar cell panel 330 of the HAPS 300 receiving the light 120 from the light irradiation unit 112.

Figure 4:
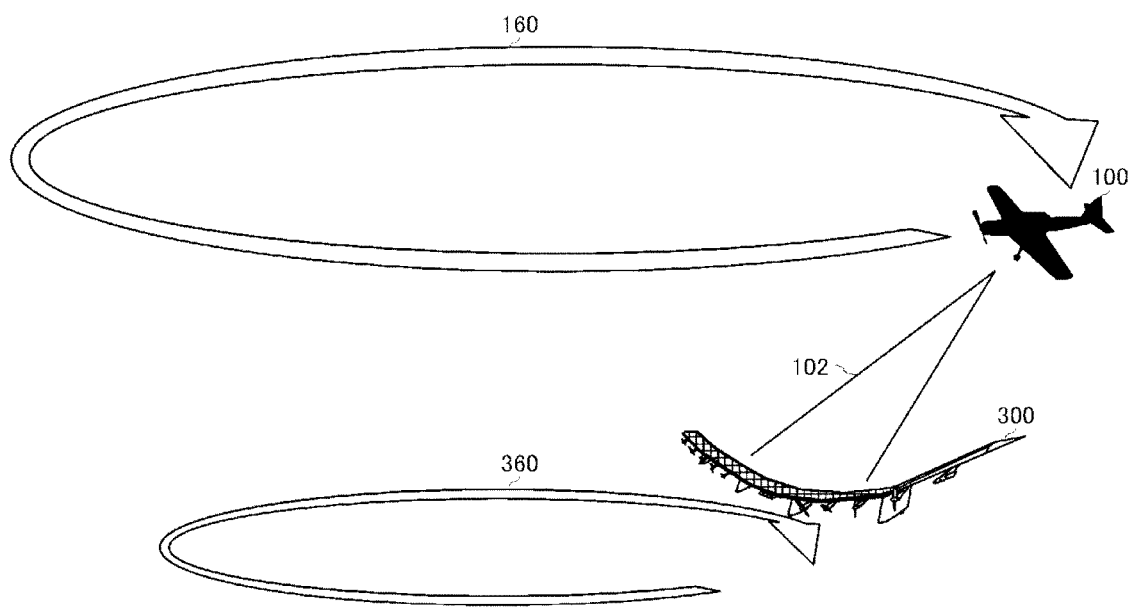
FIG. 4 schematically illustrates an example of power supply by a power supply flight vehicle 100.

FIG. 4 schematically illustrates an example of power supply by the power supply flight vehicle 100. The control unit 210 may control the power supply flight vehicle 100 so as to cause the light irradiation unit 112 to radiate the light 120 toward the solar cell panel 330 while flying on the larger circular flight route 160 with respect to the HAPS 300 circulating on the circular flight route 360.

The control unit 210 may control the power supply flight vehicle 100 so as to cause the light irradiation unit 112 to radiate the light 120 toward the solar cell panel 330 while flying on the upper side of the HAPS 300. As illustrated in FIG. 4, the control unit 210 may control the flight of the power supply flight vehicle 100 such that the position of the power supply flight vehicle 100 in the flight route 160 is at the same position as the position of the HAPS 300 in the flight route 360. As a result, the distance between the power supply flight vehicle 100 and the HAPS 300 can be further shortened as compared with the case of different positions, the irradiation distance of the light 120 can be shortened, and the irradiation direction of the light 120 can be easily adjusted.

The control unit 210 may decide the flight route 360 on the basis of the information of the flight route 160 acquired by the information acquisition unit 202. The control unit 210 may adjust the flight speed of the power supply flight vehicle 100 so as to be able to follow the HAPS 300 flying on the flight route 160 while flying on the flight route 360.

Figure 5:
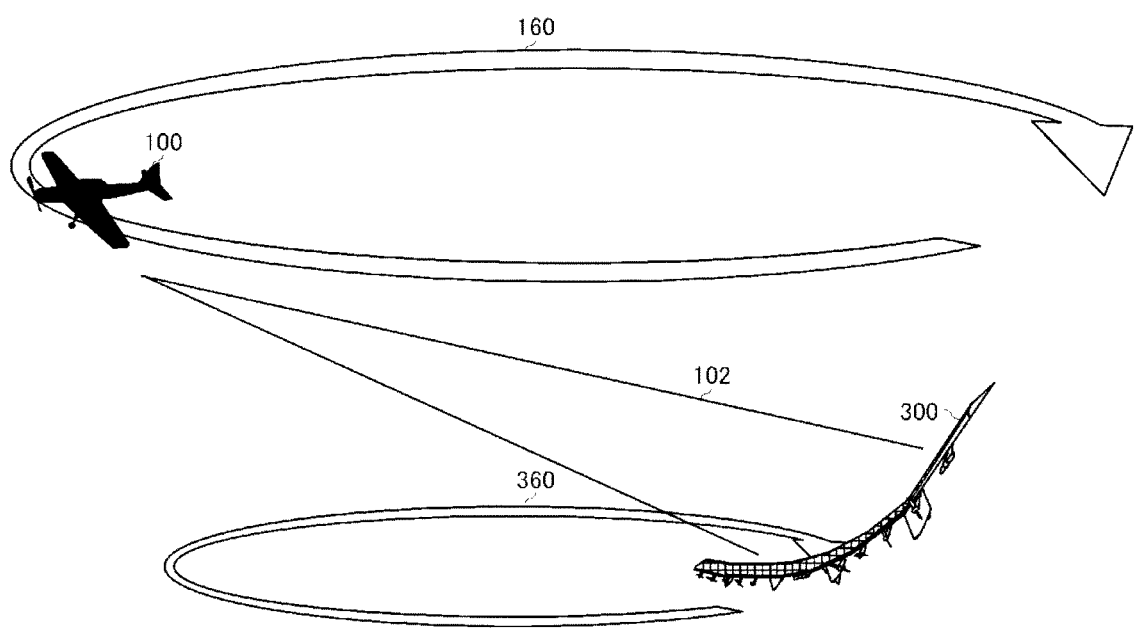
FIG. 5 schematically illustrates an example of power supply by the power supply flight vehicle 100.

FIG. 5 schematically illustrates an example of power supply by the power supply flight vehicle 100. Here, differences from FIG. 4 will be mainly described. As illustrated in FIG. 5, the control unit 210 may control the flight of the power supply flight vehicle 100 such that the position of the power supply flight vehicle 100 in the flight route 160 is positioned opposite to the position of the HAPS 300 in the flight route 360. In the example illustrated in FIG. 5, the HAPS 300 circulates on the circular flight route 360 and flies while being inclined inward, and thus when the power supply flight vehicle 100 flies at the opposite position, the inclination of the irradiation direction of the light 120 with respect to the solar cell panel 330 can be reduced, and the power supply efficiency can be increased.

Figure 6:
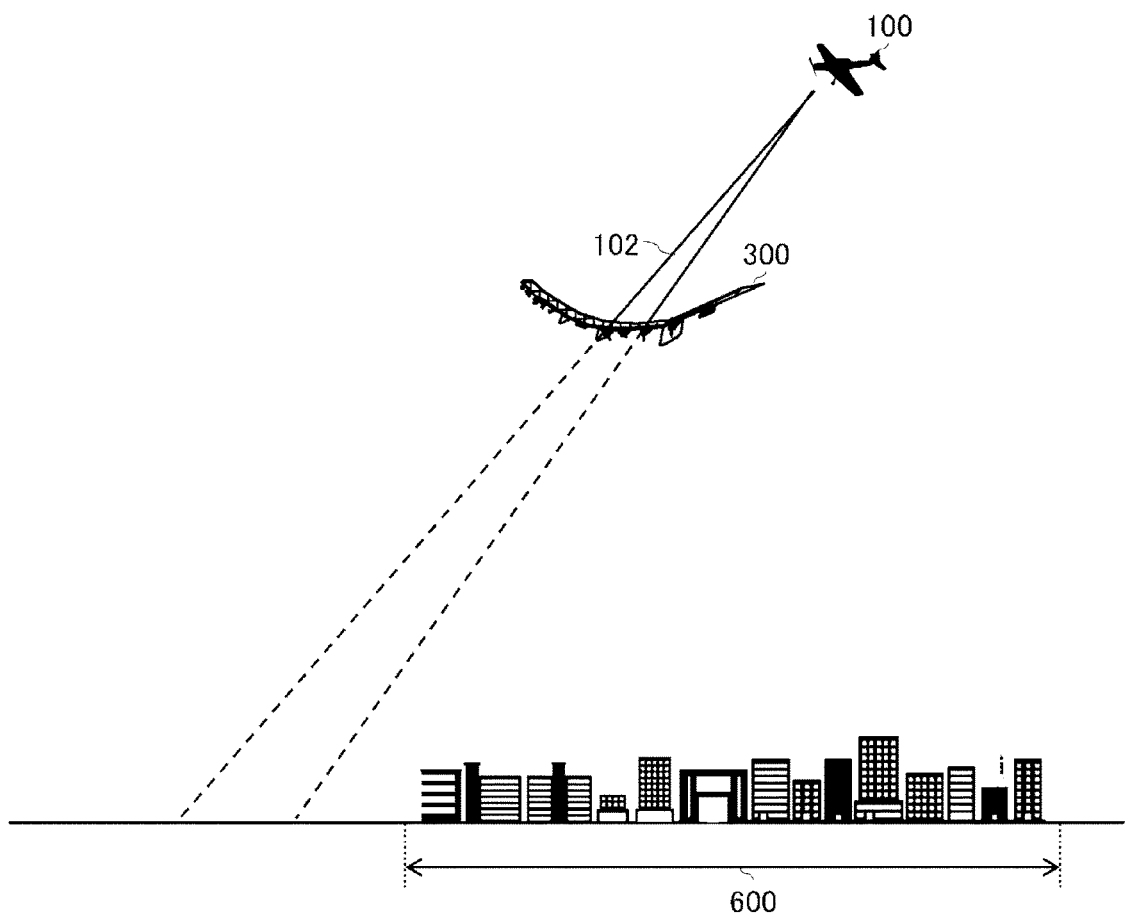
FIG. 6 schematically illustrates an example of power supply by the power supply flight vehicle 100.

FIG. 6 schematically illustrates an example of power supply by the power supply flight vehicle 100. When the light 120 is radiated from the upper side of the HAPS 300, the control unit 210 may control the power supply flight vehicle 100 so as to adjust the positional relationship with the HAPS 300 such that the irradiation direction of the light 120 deviates from a predetermined area on the ground. The area may be any area that the light 120 of the power supply flight vehicle 100 does not desirably reach.

In FIG. 6, an urban area 600 is illustrated as an example of the predetermined area. By adjusting the irradiation direction of the light 120 so as to deviate from the urban area 600, it is possible to prevent the light 120 from adversely affecting the urban area 600.

Figure 7:
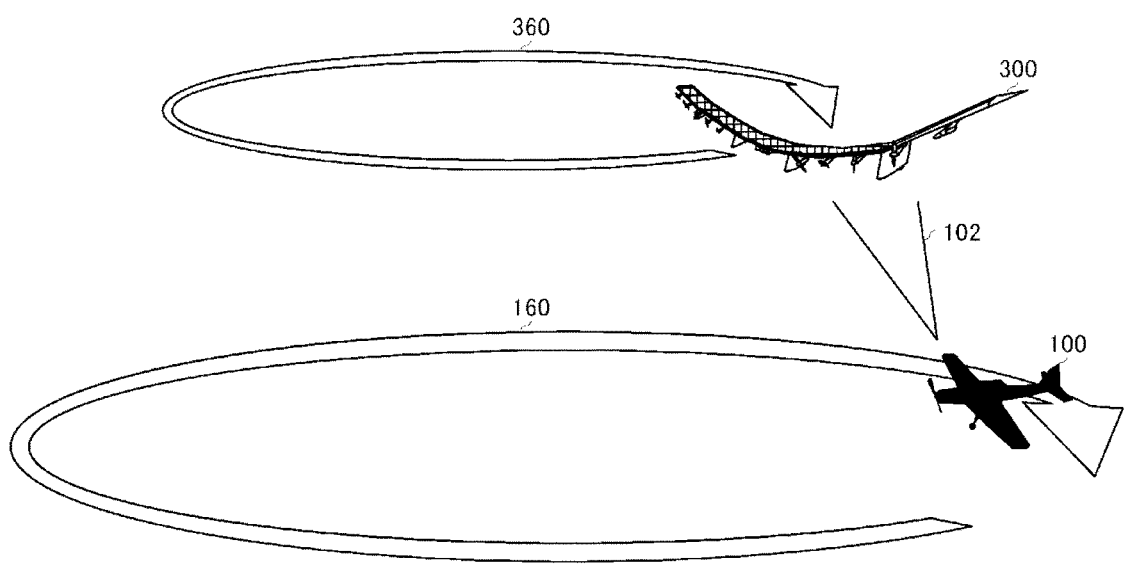
FIG. 7 schematically illustrates an example of power supply by the power supply flight vehicle 100.

FIG. 7 schematically illustrates an example of power supply by the power supply flight vehicle 100. Here, a case where the HAPS 300 has a solar cell panel on the lower surface of the wing portion 320 will be described.

The control unit 210 may control the power supply flight vehicle 100 so as to cause the light irradiation unit 112 to radiate the light 120 toward the solar cell panel on the lower surface of the HAPS 300 while flying under the HAPS 300. With the configuration in which the light 120 is radiated from the lower side toward the upper side, it is possible to prevent the light 120 from adversely affecting the ground.

Figure 8:
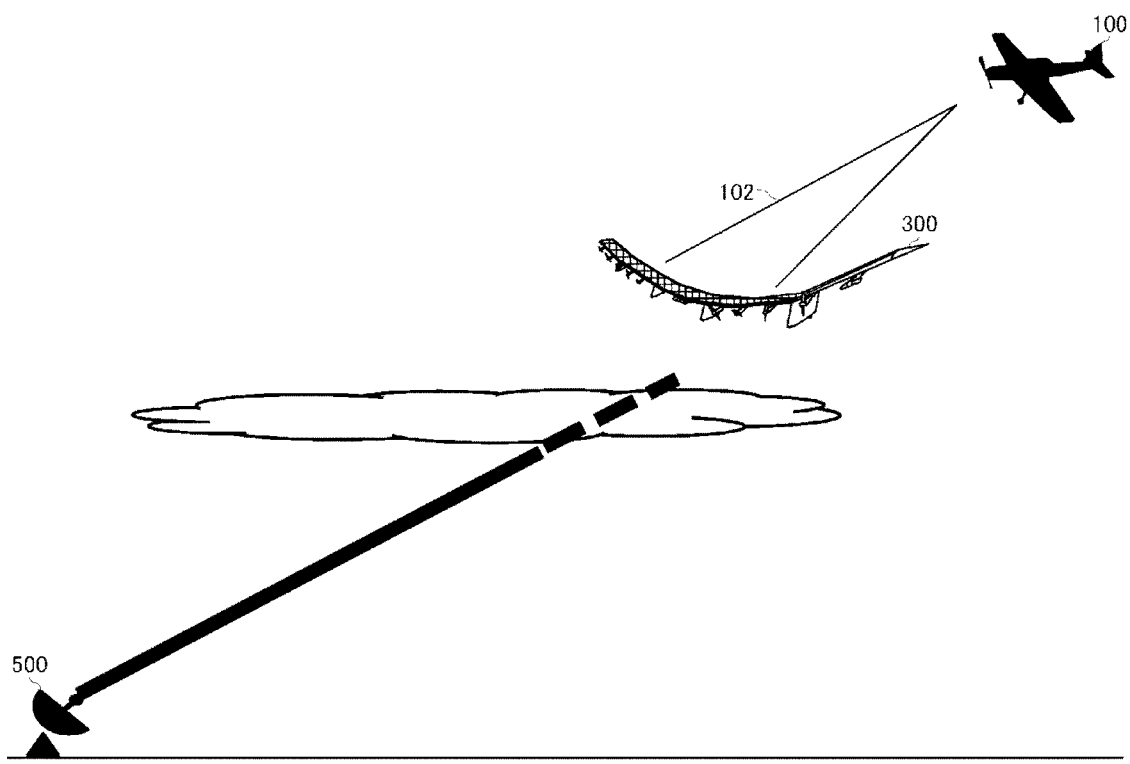
FIG. 8 schematically illustrates an example of power supply by the power supply flight vehicle 100.

FIG. 8 schematically illustrates an example of power supply by the power supply flight vehicle 100. The power supply flight vehicle 100 may function as an auxiliary function of a power supply solution from the ground, or may realize simultaneous power supply with the power supply solution from the ground.

For example, the management device 400 manages a ground projector 500. The management device 400 may cause the ground projector 500 to supply power to the HAPS 300 by radiating light toward the solar cell panel on the lower surface of the HAPS 300. For example, the management device 400 causes the power supply flight vehicle 100 to supply power to the HAPS 300 in response to generation of a cloud between the ground projector 500 and the HAPS 300 and hindrance of optical power supply.

In addition, for example, when quick charging is performed on the HAPS 300, the management device 400 may control the ground projector 500 and the power supply flight vehicle 100 so as to execute both power supply from the ground projector 500 and power supply from the power supply flight vehicle 100.

Figure 9:
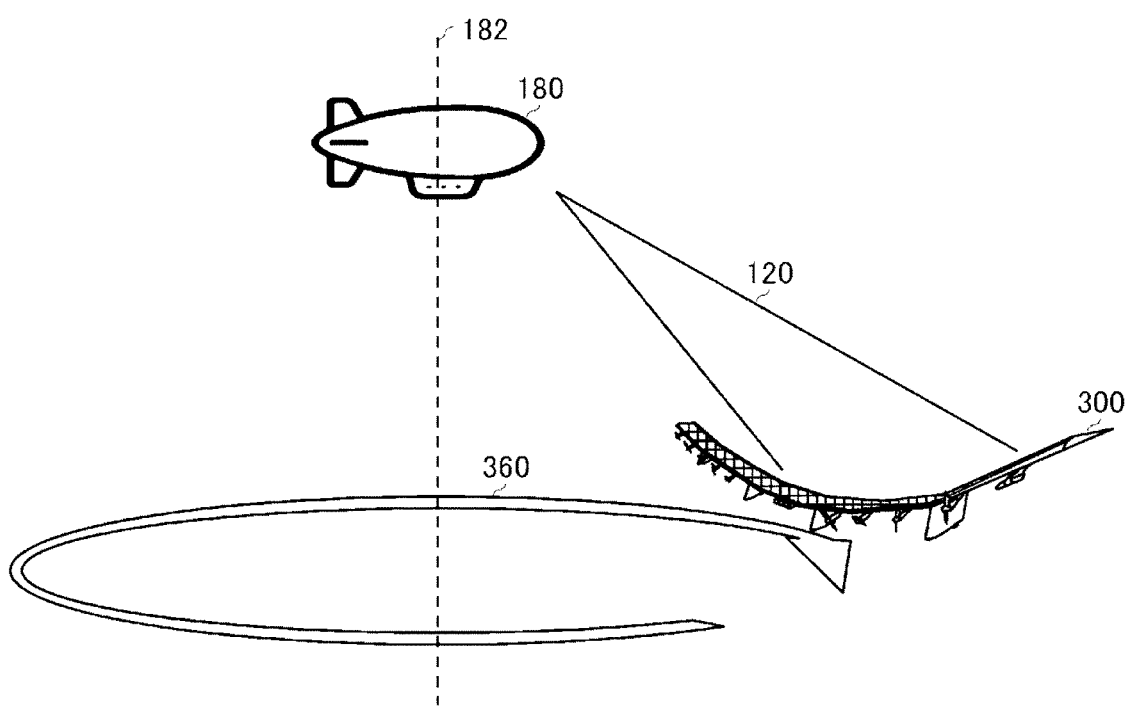
FIG. 9 schematically illustrates an example of a power supply flight vehicle 180.

FIG. 9 schematically illustrates an example of a power supply flight vehicle 180. The power supply flight vehicle 180 illustrated in FIG. 9 is an airship type. The power supply flight vehicle 180 stays near the center of the flight route 360 above the HAPS 300. Then, the power supply flight vehicle radiates the light 120 toward the HAPS 300 while rotating about a central axis 182 corresponding to the center of the flight route 360 in accordance with the flight of the HAPS 300.

Figure 10:
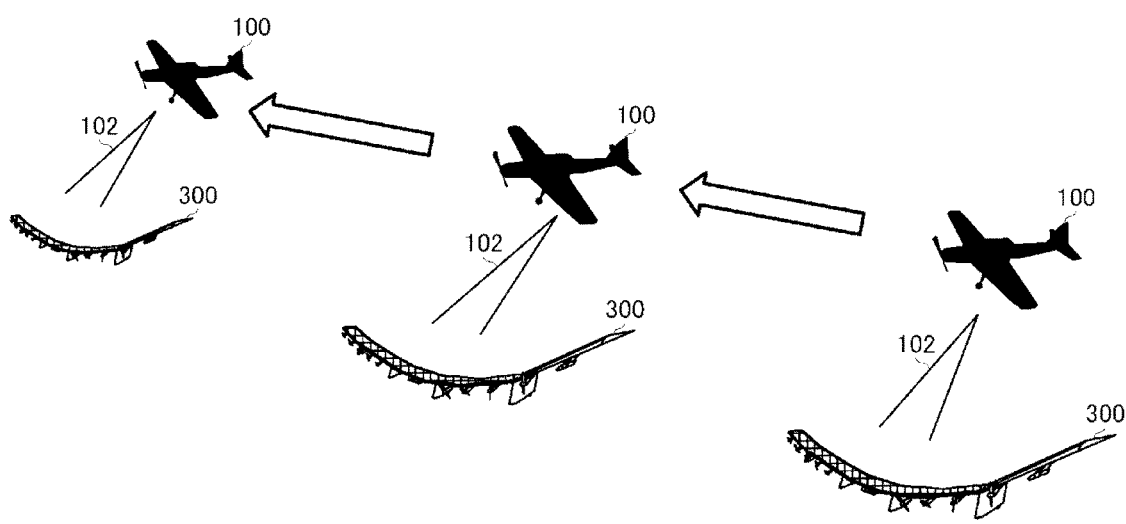
FIG. 10 schematically illustrates an example of power supply by the power supply flight vehicle 100.

FIG. 10 schematically illustrates an example of power supply by the power supply flight vehicle 100. The power supply flight vehicle 100 may supply power to a plurality of HAPSs 300 in order.

The control unit 210 may control the power supply flight vehicle 100 so as to cause the light irradiation unit 112 to radiate the light 120 to the plurality of HAPSs 300 in order. For example, the control unit 210 may control the power supply flight vehicle 100 so as to supply power to a first HAPS 300, then move to a position corresponding to the flight area of a second HAPS 300 to supply power to the second HAPS 300, and then move to a position corresponding to the flight area of a third HAPS 300 to supply power to the third HAPS 300.

The control unit 210 may decide the order of power supply according to the airflow in the flight area in which the power supply flight vehicle 100 is flying. For example, the control unit 210 may control the power supply flight vehicle 100 so as to supply power to the HAPS 300 while moving from the HAPS 300 positioned further upwind toward the HAPS 300 positioned further downwind.

The control unit 210 may receive information related to the plurality of HAPSs 300 from the management device 400, determine priorities of the plurality of HAPSs 300 on the basis of the received information, and execute power supply to the plurality of HAPSs 300 in order according to the priorities. For example, the control unit 210 acquires battery remaining amount information indicating the battery remaining amounts of the plurality of HAPSs 300. Then, the control unit 210 may set the priority of the HAPS 300 having a lower battery remaining amount to be higher, and cause the power supply flight vehicle 100 to supply power to the plurality of HAPSs 300 in order according to the set priority.

A plurality of power supply flight vehicles 100 may supply power to one HAPS 300. For example, the management device 400 may instruct the plurality of power supply flight vehicles 100 to supply power to the HAPS 300, in which an abnormality occurs in the power supply system or the battery remaining amount is smaller than a predetermined threshold, among the plurality of HAPSs 300.

The management device 400 may adjust at least one of the irradiation time by the power supply flight vehicle 100, the number of the power supply flight vehicles 100 deployed, or the standby status of the power supply flight vehicle 100 according to the status. For example, the management device 400 performs the adjustment according to whether the flight area, in which the HAPS 300 is flying, is above an urban area or above a rural area. In addition, for example, the management device 400 performs the adjustment according to at least one of the season, an air flow status in the flight area, a southern middle altitude, or the weather on the ground.

In the above embodiment, a case has been described in which the control device 200 mounted on the power supply flight vehicle 100 mainly controls the power supply flight vehicle 100 so as to cause the light irradiation unit 112 to radiate the light toward the solar cell panel 330 while flying following the flight of the HAPS 300, but the management device 400 may mainly control the power supply flight vehicle 100. In this case, the management device 400 may be an example of the control device.

Figure 11:
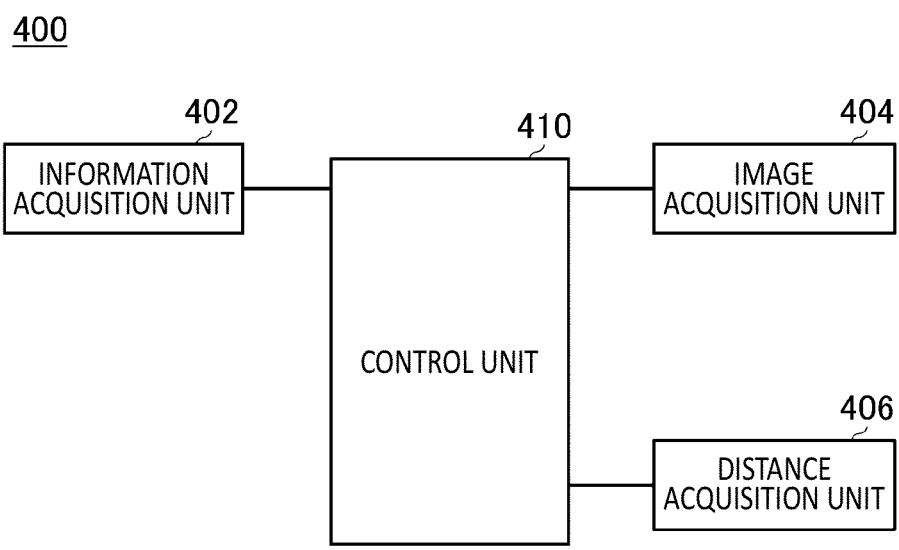
FIG. 11 schematically illustrates an example of a functional configuration of a management device 400.

FIG. 11 schematically illustrates an example of a functional configuration of the management device 400. The management device 400 includes an information acquisition unit 402, an image acquisition unit 404, a distance acquisition unit 406, and a control unit 410.

The information acquisition unit 402 acquires various types of information. The information acquisition unit 402 may acquire information related to the power supply flight vehicle 100. The information acquisition unit 402 may receive the information related to the power supply flight vehicle 100 from the power supply flight vehicle 100 via the gateway 40 and the network 20.

For example, the information acquisition unit 402 acquires the position information of the power supply flight vehicle 100. For example, the information acquisition unit 402 acquires the posture information of the power supply flight vehicle 100. For example, the information acquisition unit 402 acquires the moving direction of the power supply flight vehicle 100. For example, the information acquisition unit 402 acquires the moving speed of the power supply flight vehicle 100. For example, the information acquisition unit 402 acquires area information indicating the air flow, the air pressure, and the like of the flight area where the power supply flight vehicle 100 is flying.

The information acquisition unit 402 may acquire the information transmitted by the HAPS 300. The information acquisition unit 402 may receive the information transmitted by the HAPS 300 via the gateway 40 and the network 20.

For example, the information acquisition unit 402 acquires the telemetry information transmitted by the HAPS 300. The information acquisition unit 402 may acquire the position information of the HAPS 300. The information acquisition unit 402 may acquire the posture information of the HAPS 300. The information acquisition unit 402 may acquire the moving direction information of the HAPS 300. The information acquisition unit 402 may acquire the moving speed information of the HAPS 300. The information acquisition unit 402 may acquire area information indicating the status of the flight area in which the HAPS 300 is flying. The information acquisition unit 402 may acquire the power generation status information of the HAPS 300.

The image acquisition unit 404 acquires the captured image captured by the power supply flight vehicle 100. The image acquisition unit 404 may receive the captured image captured by the camera 114 of the power supply flight vehicle 100 via the gateway 40 and the network 20. The image acquisition unit 404 receives, for example, the captured image of the HAPS 300 captured by the camera 114.

The distance acquisition unit 406 acquires a distance between the power supply flight vehicle 100 and the HAPS 300. The distance acquisition unit 406 may receive the distance, which the power supply flight vehicle 100 measures by using the radar 116, between the power supply flight vehicle 100 and the HAPS 300 from the power supply flight vehicle 100 via the gateway 40 and the network 20.

The control unit 410 controls the HAPS 300. The control unit 410 may control the HAPS 300 by transmitting various instructions to the HAPS 300 via the network 20 and the gateway 40. The control unit 410 may control the HAPS 300 by transmitting various instructions to the HAPS 300 via a communication satellite. The control unit 410 may cause the HAPS 300 to hover in the sky above the target area so that the wireless communication area 304 covers the target area on the ground.

The control unit 410 controls the power supply flight vehicle 100. The control unit 410 may control the power supply flight vehicle 100 by transmitting various instructions to the power supply flight vehicle 100 via the network 20 and the gateway 40. The control unit 410 may control the power supply flight vehicle 100 by transmitting various instructions to the power supply flight vehicle 100 via a communication satellite. The control unit 410 instructs the power supply flight vehicle 100 to supply power to the HAPS 300, for example, when an abnormality occurs in the power supply system of the HAPS 300 or the amount of power generated by the solar cell panel 330 alone is insufficient for the power.

Similarly to the control unit 210, on the basis of the control-related information, the control unit 410 may control the power supply flight vehicle 100 so as to cause the light irradiation unit 112 to radiate the light 120 toward the solar cell panel 330 of the HAPS 300 while flying following the flight of the HAPS 300.

Figure 12:
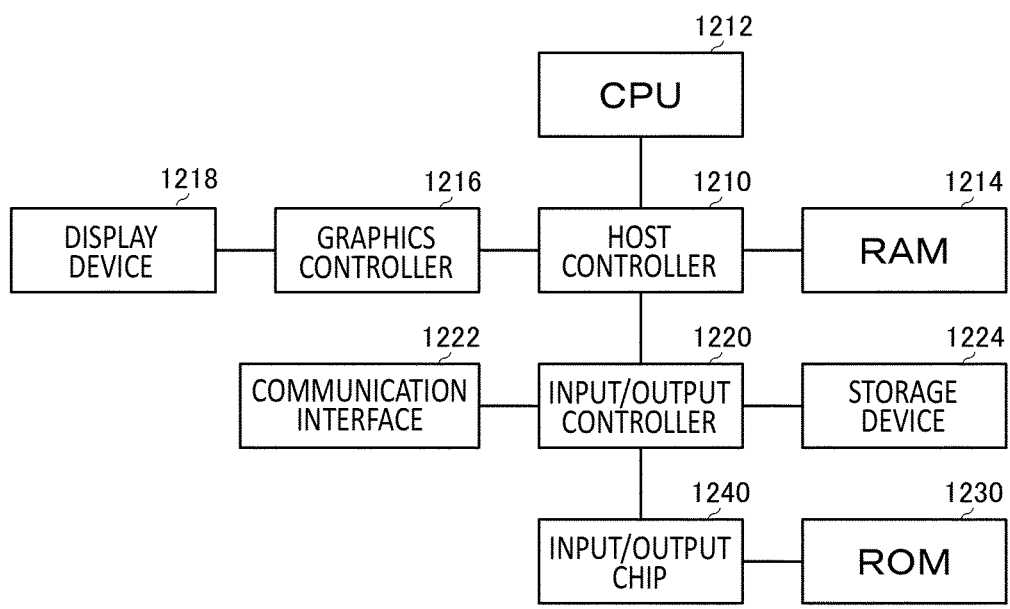
FIG. 12 schematically illustrates an example of a hardware configuration of a computer 1200 that functions as the control device 200 or the management device 400.

FIG. 12 schematically illustrates an example of a hardware configuration of a computer 1200 that functions as the control device 200 or the management device 400. Programs installed in the computer 1200 can cause the computer 1200 to function as one or more "units" of the apparatus according to the present embodiment or can cause the computer 1200 to execute operations associated with the apparatuses according to the present embodiment or the one or more "units", and/or can cause the computer 1200 to execute a process according to the present embodiment or steps of the process. Such a program may be executed by a CPU 1212 to cause the computer 1200 to perform particular operations associated with some or all of the blocks in the flowcharts and block diagrams described in the specification.

The computer 1200 according to the present embodiment includes the CPU 1212, a RAM 1214, and a graphics controller 1216, which are connected to each other via a host controller 1210. In addition, the computer 1200 includes input/output units such as a communication interface 1222, a storage apparatus 1224, and a DVD driver and an IC card drive, which are connected to the host controller 1210 through an input/output controller 1220. The storage apparatus 1224 may be a hard disk drive, a solid-state drive, and the like. The computer 1200 also includes a ROM 1230 and a legacy input/output unit such as a keyboard, which are connected to the input/output controller 1220 via an input/output chip 1240.

The CPU 1212 operates according to the programs stored in the ROM 1230 and the RAM 1214, thereby controlling each unit. The graphics controller 1216 obtains image data which is generated by the CPU 1212 in a frame buffer or the like provided in the RAM 1214 or in itself so as to cause the image data to be displayed on a display device 1218.

The communication interface 1222 communicates with other electronic devices via a network. The storage apparatus 1224 stores a program and data used by the CPU 1212 in the computer 1200. The IC card drive reads the program and data from an IC card, and/or writes the program and data to the IC card.

The ROM 1230 stores therein a boot program or the like executed by the computer 1200 at the time of activation, and/or a program depending on the hardware of the computer 1200. The input/output chip 1240 may also connect various input/output units via a USB port, a parallel port, a serial port, a keyboard port, a mouse port or the like to the input/output controller 1220.

A program is provided by a computer readable storage medium such as the DVD-ROM or the IC card. The program is read from the computer readable storage medium, installed into the storage apparatus 1224, RAM 1214, or ROM 1230, which are also examples of a computer readable storage medium, and executed by the CPU 1212. Information processing written in these programs is read by the computer 1200, and provides cooperation between the programs and the various types of hardware resources described above. An apparatus or method may be constituted by realizing the operation or processing of information in accordance with the usage of the computer 1200.

For example, in a case where a communication is performed between the computer 1200 and an external device, the CPU 1212 may execute a communication program loaded in the RAM 1214 and instruct the communication interface 1222 to perform communication processing based on a process written in the communication program. The communication interface 1222, under control of the CPU 1212, reads transmission data stored on a transmission buffer region provided in a recording medium such as the RAM 1214, the storage apparatus 1224, the DVD-ROM, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage apparatus 1224, the DVD drive (DVD-ROM), the IC card, etc., and perform various types of processing on the data on the RAM 1214. Then, the CPU 1212 may write the processed data back in the external recording medium.

Various types of information, such as various types of programs, data, tables, and databases, may be stored in the recording medium to undergo information processing. The CPU 1212 may execute, on the data read from the RAM 1214, various types of processing including various types of operations, information processing, conditional judgement, conditional branching, unconditional branching, information retrieval/replacement, or the like described throughout the present disclosure and specified by instruction sequences of the programs, to write the results back to the RAM 1214. In addition, the CPU 1212 may retrieve information in a file, a database, or the like in the recording medium. For example, when a plurality of entries, each having an attribute value of a first attribute associated with an attribute value of a second attribute, are stored in the recording medium, the CPU 1212 may search for an entry whose attribute value of the first attribute matches a designated condition, from among the plurality of entries, and read the attribute value of the second attribute stored in the entry, thereby obtaining the attribute value of the second attribute associated with the first attribute satisfying a predetermined condition.

The program or software module described above may be stored on the computer 1200 or in a computer readable storage medium near the computer 1200. In addition, a recording medium such as a hard disk or a RAM provided in a server system connected to a dedicated communication network or the Internet can be used as the computer readable storage medium, thereby providing the program to the computer 1200 via the network.

Blocks in flowcharts and block diagrams in the present embodiments may represent steps of processes in which operations are performed or "units" of apparatuses responsible for performing operations. A particular step and "unit" may be implemented by dedicated circuitry, programmable circuitry supplied along with a computer readable instruction stored on a computer readable storage medium, and/or a processor supplied along with the computer readable instruction stored on the computer readable storage medium. The dedicated circuitry may include a digital and/or analog hardware circuit, or may include an integrated circuit (IC) and/or a discrete circuit. The programmable circuitry may include, for example, a reconfigurable hardware circuit including logical AND, logical OR, logical XOR, logical NAND, logical NOR, and other logical operations, and a flip-flop, a register, and a memory element, such as a field-programmable gate array (FPGA) and a programmable logic array (PLA).

The computer readable storage medium may include any tangible device capable of storing an instruction performed by an appropriate device, so that the computer readable storage medium having the instruction stored thereon constitutes a product including an instruction that may be performed in order to provide means for performing an operation specified by a flowchart or a block diagram. Examples of the computer readable storage medium may include an electronic storage medium, a magnetic storage medium, an optical storage medium, an electromagnetic storage medium, a semiconductor storage medium, and the like. More specific examples of computer readable storage media may include a floppy disc (registered trademark), a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

The computer-readable instruction may include either of source code or object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), JAVA (registered trademark), C++, or the like; and a conventional procedural programming language such as a "C" programming language or a similar programming language.

The computer readable instruction may be provided to a general purpose computer, a special purpose computer, or a processor or programmable circuitry of another programmable data processing apparatus locally or via a local area network (LAN), a wide area network (WAN) such as the Internet or the like in order that the general purpose computer, the special purpose computer, or the processor or the programmable circuitry of the other programmable data processing apparatus performs the computer readable instruction to provide means for performing operations specified by the flowchart or the block diagram. An example of the processor includes a computer processor, processing unit, microprocessor, digital signal processor, controller, microcontroller, or the like.

While the present invention has been described with the embodiments, the technical scope of the present invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: system; 20: network; 30: user terminal; 40: gateway; 100: power supply flight vehicle; 110: mounting unit; 112: light irradiation unit; 114: camera; 116: radar; 120: light; 160: flight route; 180: power supply flight vehicle; 200: control device; 202: information acquisition unit; 204: image acquisition unit; 206: distance acquisition unit; 208: instruction reception unit; 210: control unit; 300: HAPS; 302: feeder link; 304: wireless communication area; 310: main body portion; 312: control device; 320: wing portion; 330: solar cell panel; 360: flight route; 400: management device; 402: information acquisition unit; 404: image acquisition unit; 406 distance acquisition unit; 410: control unit; 500: ground projector; 600: urban area; 1200: computer; 1210: host controller; 1212: CPU; 1214: RAM; 1216: graphic controller; 1218: display device; 1220: input/output controller; 1222: communication interface; 1224: storage apparatus; 1230: ROM; 1240: input/output chip.

What is claimed is:

1. A control device which controls a power supply flight vehicle, comprising:
    a control unit which controls the power supply flight vehicle so as to cause a light irradiation unit to radiate light toward a solar cell panel while flying following flight of a power supply target flight vehicle on which the solar cell panel is mounted; and
    an information acquisition unit which acquires posture information of the power supply target flight vehicle,
    wherein the posture information is transmitted by the power supply target flight vehicle,
    wherein on a basis of the posture information, the control unit controls the power supply flight vehicle to adjust a direction of light radiated by the light irradiation unit, and
    wherein the posture information comprises a pitch, a roll, and a yaw of the power supply target flight vehicle.

2. The control device according to claim 1, wherein the power supply target flight vehicle functions as a stratospheric platform, and
the control unit controls the power supply flight vehicle so as to cause the light irradiation unit to radiate light toward the solar cell panel while flying following the flight of the power supply target flight vehicle in stratosphere.

3. The control device according to claim 1, wherein the information acquisition unit acquires area information indicating a status of a flight area in which the power supply target flight vehicle is flying, the area information being transmitted by the power supply target flight vehicle, and
on a basis of the area information, the control unit controls the power supply flight vehicle so as to adjust a direction of light radiated by the light irradiation unit.

4. The control device according to claim 3, wherein the information acquisition unit acquires power generation status information indicating a status of power generation by the solar cell panel of the power supply target flight vehicle, the power generation status information being transmitted by the power supply target flight vehicle, and on a basis of the power generation status information, the control unit controls the power supply flight vehicle so as to adjust a direction of light radiated by the light irradiation unit.

5. The control device according to claim 1, wherein
the information acquisition unit acquires power generation status information indicating a status of power generation by the solar cell panel of the power supply target flight vehicle, the power generation status information being transmitted by the power supply target flight vehicle, and
on a basis of the power generation status information, the control unit controls the power supply flight vehicle so as to adjust a direction of light radiated by the light irradiation unit.

6. The control device according to claim 1, comprising
an image acquisition unit which acquires a captured image of the power supply target flight vehicle captured by a camera included in the power supply flight vehicle, wherein
on a basis of the captured image, the control unit controls the power supply flight vehicle so as to adjust a direction of light radiated by the light irradiation unit.

7. The control device according to claim 6, wherein the control unit determines a status of the solar cell panel of the power supply target flight vehicle on a basis of the captured image, and controls the power supply flight vehicle so as to adjust a direction of light radiated by the light irradiation unit according to a determination result.

8. The control device according to claim 1, comprising
a distance acquisition unit which acquires a distance between the power supply flight vehicle and the power supply target flight vehicle, the distance being measured by a radar included in the power supply flight vehicle, wherein
on a basis of the distance, the control unit controls the power supply flight vehicle so as to adjust a direction of light radiated by the light irradiation unit.

9. The control device according to claim 1, wherein
the control unit controls the power supply flight vehicle so as to cause the light irradiation unit to radiate light toward the solar cell panel while flying on a larger circular flight route with respect to the power supply target flight vehicle circulating on a circular flight route.

10. The control device according to claim 1, wherein
the power supply target flight vehicle has the solar cell panel on an upper surface of a wing portion, and
the control unit controls the power supply flight vehicle so as to cause the light irradiation unit to radiate light toward the solar cell panel while flying on an upper side of the power supply target flight vehicle.

11. The control device according to claim 10, wherein the control unit controls the power supply flight vehicle so as to adjust a positional relationship with the power supply target flight vehicle such that an irradiation direction of the light deviates from a predetermined area on ground.

12. The control device according to claim 1, wherein
the power supply target flight vehicle has the solar cell panel on a lower surface of a wing portion, and
the control unit controls the power supply flight vehicle so as to cause the light irradiation unit to emit light toward the solar cell panel while flying under the power supply target flight vehicle.

13. The control device according to claim 1, wherein the control unit controls the power supply flight vehicle so as to cause the light irradiation unit to radiate light to a plurality of the power supply target flight vehicles in order.

14. The control device according to claim 1, wherein the control device is mounted on the power supply flight vehicle.

15. A system comprising:
the control device according to claim 1; and
the power supply flight vehicle.

16. The system according to claim 15, wherein
the control device is arranged on ground, and
the control unit controls the power supply flight vehicle by transmitting instruction data to the power supply flight vehicle.

17. A non-transitory computer readable medium having recorded thereon a program for causing a computer to function as a control device which controls a power supply flight vehicle, the control device including:
a control unit which controls the power supply flight vehicle so as to cause a light irradiation unit to radiate light toward a solar cell panel while flying following flight of a power supply target flight vehicle on which the solar cell panel is mounted; and
an information acquisition unit which acquires posture information of the power supply target flight vehicle,
wherein the posture information is transmitted by the power supply target flight vehicle,
wherein on a basis of the posture information, the control unit controls the power supply flight vehicle to adjust a direction of light radiated by the light irradiation unit, and
wherein the posture information comprises a pitch, a roll, and a yaw of the power supply target flight vehicle.

18. A control method to control a power supply flight vehicle, which is executed by a computer, the method comprising:
controlling the power supply flight vehicle so as to cause a light irradiation unit to radiate light toward a solar cell panel while flying following flight of a power supply target flight vehicle on which the solar cell panel is mounted; and
acquiring posture information of the power supply target flight vehicle,
wherein the posture information is transmitted by the power supply target flight vehicle,
wherein on a basis of the posture information, the controlling controls the power supply flight vehicle to adjust a direction of light radiated by the light irradiation unit, and
wherein the posture information comprises at least one of a pitch, a roll, and and/or a yaw of the power supply target flight vehicle.

* * * * *